United States Patent [19]
Mori

[11] 4,323,881
[45] Apr. 6, 1982

[54] RADIO PAGER WITH REDUCED POWER CONSUMPTION

[75] Inventor: Toshihiro Mori, Tokyo, Japan

[73] Assignee: Nippon Electric Co., Ltd., Minato, Japan

[21] Appl. No.: 147,920

[22] Filed: May 8, 1980

[30] Foreign Application Priority Data

May 10, 1979 [JP] Japan .................................. 54-57241

[51] Int. Cl.³ .......................... H04Q 9/10; G11C 7/00; H04B 5/04
[52] U.S. Cl. .......................... 340/825.48; 340/825.75; 365/227
[58] Field of Search ............. 340/171 R, 171 PF, 311, 340/168 S; 365/227

[56] References Cited
U.S. PATENT DOCUMENTS 3,882,466  5/1975  Poorvin ........................ 341/171 PF
4,152,627  5/1979  Priel et al. ............................ 365/227
4,181,893  1/1980  Ehmke ................................. 340/311

Primary Examiner—Donald J. Yusko
Attorney, Agent, or Firm—Laff, Whitesel, Conte & Saret

[57] ABSTRACT

A radio-paging receiver gives a signal responsive to the receipt of a predetermined sequence of tone signals. The sequence is identified by an identification number stored in and read out of a read-only memory (ROM), which is a high-power consumption circuit. The remainder of the radio-paging receiver is constructed from low-power consumption components. Other than the read-out of the ROM, all other of the circuit operations are carried out by the circuits having low-power consumption components. The high-power drain read-only memory is operated only momentarily and then its output is stored in low-power consumption circuits, for future reference. This way, the high-power drain operations are restricted to extremely short periods, with no energy wasted in a waiting time.

9 Claims, 17 Drawing Figures

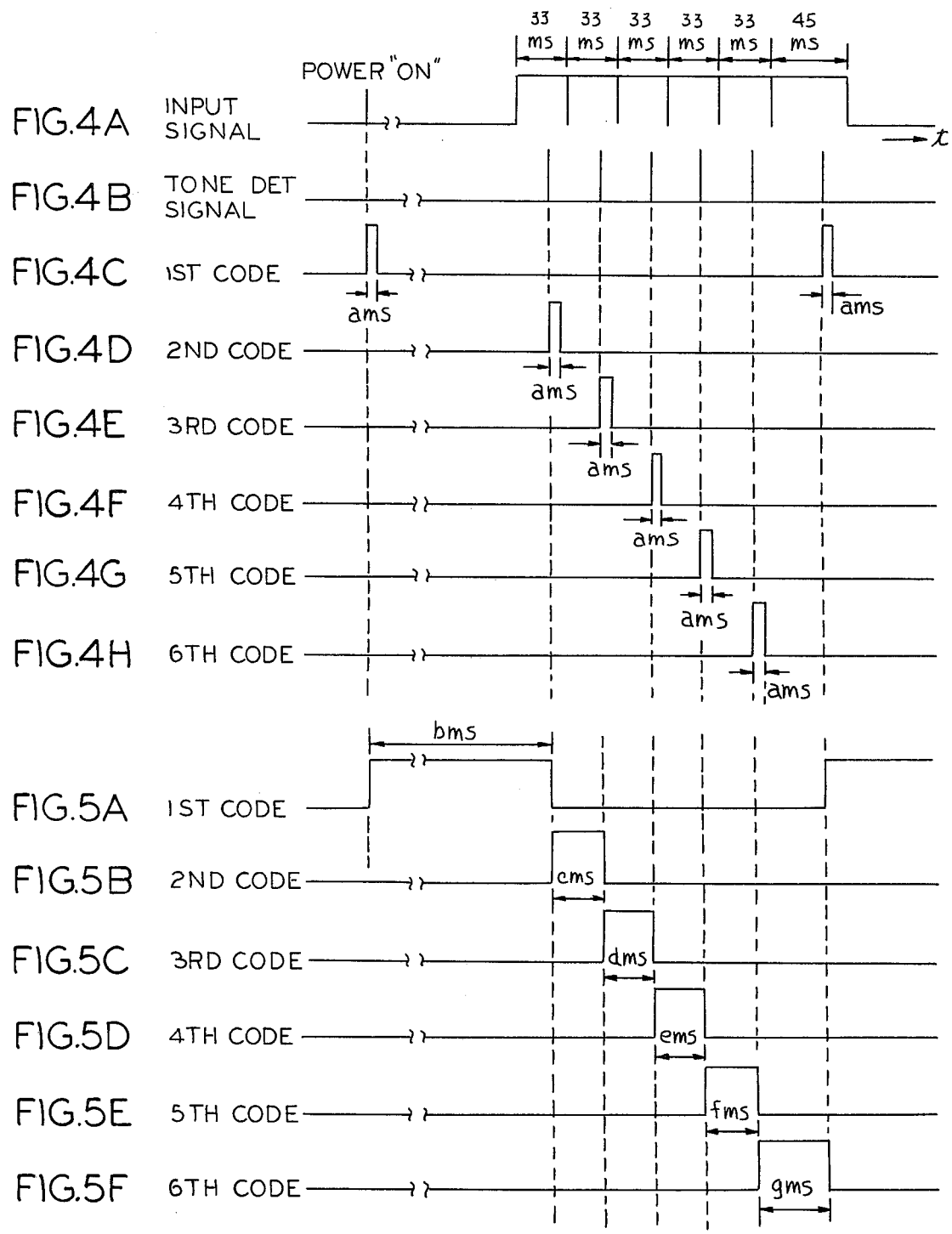

RADIO PAGER WITH REDUCED POWER CONSUMPTION

This invention relates to radio-paging receivers and, more particularly, to paging receivers designed to operate with a power consumption which is lower than the power consumption of presently used paging receivers.

The inventive receiver includes a memory circuit which stores a code corresponding to a predetermined identification (ID) number. When the receiver detects a coincidence between a received code and an ID code number read out of its own memory circuit, the receiver indicates that the desired receiver-holder is being paged. The reason for the page is not relevant to the invention; it probably means that the receiver-holder should respond by telephoning a predetermined number.

One known kind of paging receiver of this general type is described in the U.S. Pat. No. 3,882,466. This particular receiver has a section which responds to a carrier wave modulated by a predetermined sequence of tones, corresponding to the ID number of called paging receiver. This carrier is demodulated to retrieve the tones. A read-only memory (ROM) within the receiver stores a predetermined ID number which is specifically assigned to that receiver. A first decoder decodes the binary-coded output of the ROM to provide a decimal code and to emit a voltage corresponding to the decoded decimal code. A variable band pass filter is adjusted to selectively pass the first demodulated tone from the receiver section, in response to the output voltage of the first decoder. A tone detector then responds to and detects the output of this filter. A second decoder successively reads out the contents to the ROM in response to each output of the tone detector, and successively adjusts the variable band pass filter to receive the next tone.

In response to the final output from the second decoder and to the last demodulated tone signal from the receiver section, a suitable paging annunciation is given. In this receiver, the tone detector, and the first and second decoders are made of complementary-metal oxide semiconductors (C-MOS's) or other components designed to consume less power. However, despite the use of these efficient components, the entire receiver cannot, as a whole, achieve any significant power savings because the power consumption of its ROM is considerably greater than the power savings of other parts, where the C-MOS's are used.

Therefore, an object of the present invention is to provide a radio-paging receiver consuming significantly less electric power, in view of the above-stated circumstances.

In accordance with an aspect of this invention, the power consumption of a radio-paging receiver is minimized. It responds to a carrier wave successively modulated by any of a sequence of tone signals to provide a signal sequence which corresponds to an ID number of a called receiver. This carrier is demodulated and applied to a variable band pass filter which includes a means for altering the center frequency of its pass band in response to a first control signal and for thereafter selectively passing the demodulated tone signal to a detector. A predetermined ID number, which is stored in a ROM of the receiver, is quickly read out of memory responsive to a second control signal and then is held for future reference in a storage circuit having low-power consumption characteristics. The readout and stored ID number is decoded and used to supply the first control signal to the means for altering the center frequency of the variable pass band. The second control signal is generated in response to the output of the demodulated tone signal detector, in coincidence with the ID number of the called receiver and the predetermined ID number which is stored in the ROM of the receiver. The annunciating signal is generated in response to the generation of the second control signal after the last of the ID tone signals is received. The time required for the power consuming ROM to operate is thus minimized by its fast operation followed by the storage of the readout data in this low-power consumption storage circuit.

Further advantages and features of the present invention will become more apparent from the following detailed description taken in conjunction with the accompanying drawings wherein.

Figure 1:
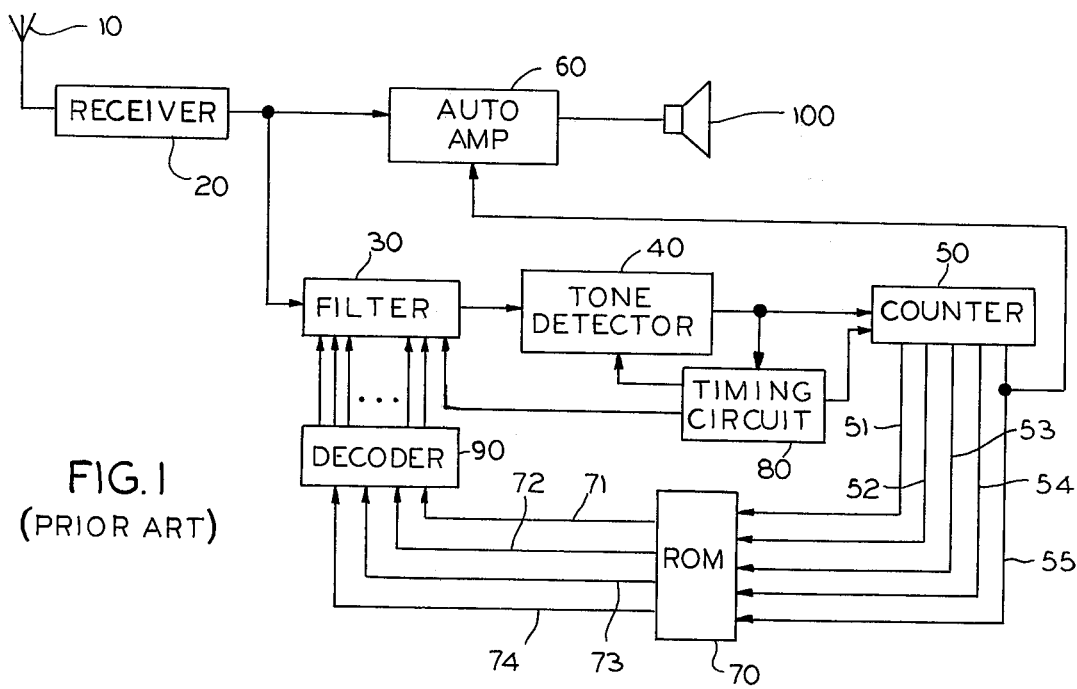
FIG. 1 is a block diagram of a prior art paging receiver of the high-power consumption variety.
Figure 2:
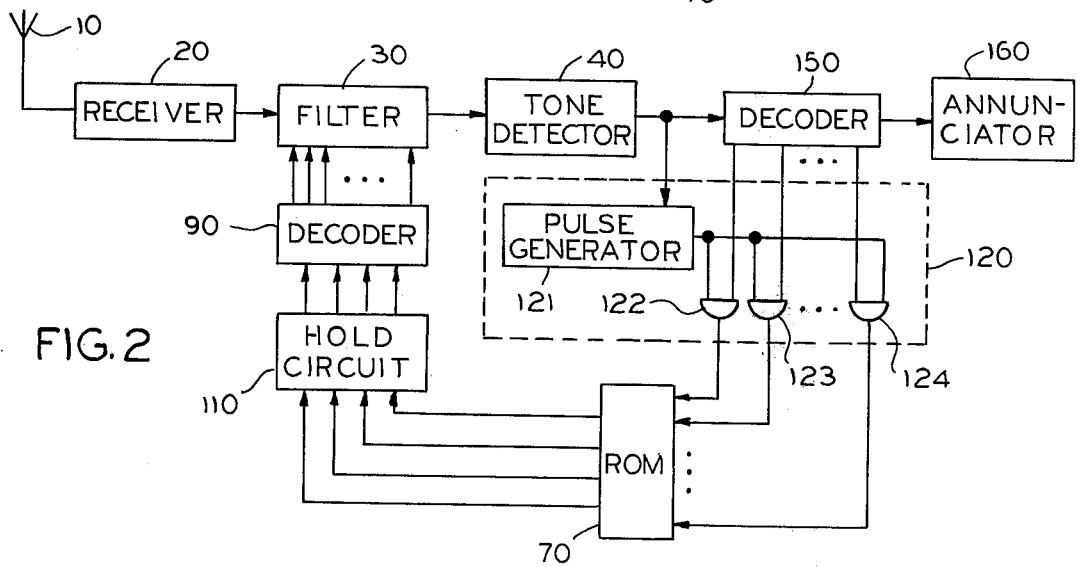
FIG. 2 is a block diagram of a preferred embodiment of the present invention which reduces power consumption.

FIGS. 4A through 4H show the relationship between the ROM read pulse width of each digit of the ID number signal and the input signal received by the paging receiver shown in FIG. 2; and FIGS. 5A through 5F show the relationship between the ROM read pulse width of each digit of the ID number signal and the input signal in a conventional prior art paging receiver, as shown in FIG. 1, the power savings of the invention appearing as reduced pulse widths in FIG. 4 as compared to the pulse widths in FIG. 5.

The conventional prior art paging receiver (FIG. 1) has an antenna 10 and a receiver 20 to receive a carrier wave modulated by any of a plurality of tone signals. Receiver 20 demodulates this received signal and, responsive thereto, emits a demodulated tone signal. In this example, the demodulated tone signals have five sequential tones, which together constitute an ID number signal.

The demodulated tone signal passes through a variable band pass filter 30 which initially has a center frequency corresponding to the first of the ID numbers which identify the specific receiver. The tone from the filter is detected by a tone detector 40, having an output of pulses which are successively counted by a counter 50. The counter 50 is preset by a timing circuit 80 when the receiver is turned on. The counter designates, via connecting line 51, a first address in an ROM 70, and reads out the memory content stored at that address. Having counted the pulses indicated by a first tone, the counter 50 designates a second address in the ROM 70 via a connecting line 52.

The ROM 70 stores, at its first through fifth addresses, information corresponding to the first through fifth digits of its ID number which identifies the receiver containing the ROM. This ID number is read out, a digit at a time, in response to the successive outputs of the counter 50. The information read out of the ROM 70 comprises binary-coded signals, which are fed to a binary-to-decimal decoder 90, via connecting lines 71 to 74. In response to signals from the ROM 70, the decoder 90 successively varies the center frequency of the variable band pass filter 30 in accordance with a predetermined code. The filter 30 is thus caused to selectively pass demodulated tone signals from the receiver 20.

When all of the first through fifth tone signals have been received in this manner, the counter 50 supplies an alert control signal in response to the detection of the final tone. This alert control signal is supplied to an audio amplifier 60, which amplifies the output from the receiver 20 and drives a speaker 100 to generate an audible alert tone. For further details about this receiver, reference may be made to the aforementioned U.S. Pat. No. 3,882,466.

In this conventional paging receiver, the detector 40, counter 50, timing circuit 80, and decoder 90 are constructed from low power-consuming C-MOS's to reduce the overall power consumption of the receiver. However, the ROM 70 is constructed from high-power-consuming transistors or diodes, and always has to hold the content of its first address while waiting for calling an ID signal. While the second through fifth tones are being received, the content of each address must be held for an entire period corresponding to the time during which the pertinent tone is being transmitted. This prolonged ROM operation involves an enormous consumption of power.

In FIG. 2, the various component circuits are identified by the same numerals 10 to 90 which are used to identify corresponding component circuits in FIG. 1. Again, radio signals are supplied from the antenna 10 to the receiver 20, and there demodulated into tone signals.

Figure 3:
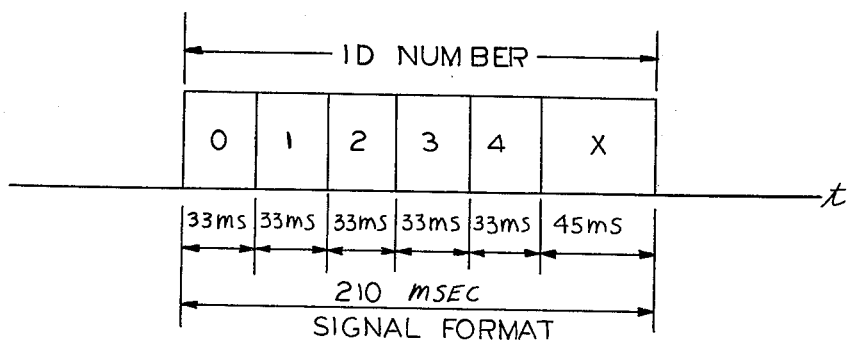
FIG. 3 shows the format of a tone signal, corresponding to a paging receiver ID number, such as that used in the paging receiver shown in FIG. 2.

FIG. 3 shows the format of the various tone signals used in the inventive system. This signal format is commonly known as a five-tone system.

FIG. 3 indicates, by way of example, that the paged receiver has the ID or identification number "01234". The sixth tone (designated "X") must be received within a prescribed length of time (45 msec, in this particular embodiment) after the first through fifth tones have been received. One of two alternative states is thus created (the first being the reception of the ID number "01234" and the second the reception of the ID number "01234X"). The subscriber who holds this receiver is given these two equivalent ID numbers.

The annunciating means 160 has two different outputs, each corresponding to one or the other of these numbers (i.e., one audible signal is given when the "X" is received and a second audible signal is given when the "X" is not received). This difference in the audible signal output enables the subscriber to judge which of the two numbers he has received. Therefore, he is advised as to which of two different locations has paged him. Accordingly, he will direct his answer to the address or telephone number indicated by these two ID numbers, in order to respond to the calling party.

The relationships of the symbols constituting the ID numbers, the various tone frequencies and the recognition codes are shown in the following Table 1:

TABLE 1

| Symbol | Frequency (Hz) | (Negative Logic) $2^3$ | $2^2$ | $2^1$ | $2^0$ |
|---|---|---|---|---|---|
| R | 459 | L | H | L | H |
| 0 | 600 | H | H | H | H |
| 1 | 741 | H | H | H | L |
| 2 | 882 | H | H | L | H |

TABLE 1-continued

| Symbol | Frequency (Hz) | (Negative Logic) $2^3$ | $2^2$ | $2^1$ | $2^0$ |
|---|---|---|---|---|---|
| 3 | 1023 | H | H | L | L |
| 4 | 1164 | H | L | H | H |
| 5 | 1305 | H | L | H | L |
| 6 | 1446 | H | L | L | H |
| 7 | 1587 | H | L | L | L |
| 8 | 1728 | L | H | H | H |
| 9 | 1869 | L | H | H | L |
| X | 2010 | L | L | H | H |

Symbol "R" in Table 1 is a repeat symbol. For instance, in an ID number of "33992", the distinction between the first and second or between the third and fourth tones may not be sufficiently clear to ensure satisfactory discrimination upon reception. The discrimination could be facilitated by the use of the "R" (or repeat) tones to indicate a repetition of the same numerals; thus, "33992" might be replaced by "3R9R2".

The operation of the circuit of FIG. 2 will now be described in more detail, with reference to the time charts of FIGS. 4A through 4H. From the time when it is first turned on until the first tone signal of the ID number is received, the receiver remains in an initial state. Thus, when the power supply is first switched on, a decoder 150 (FIG. 2), constructed of low-power consumption components, applies the "H" (high) level signal to one input of a single AND gate 122, which corresponds to the first address of the ROM where "0" of the ID number (FIG. 3) is stored. One input of each of the other AND gates 123 through 124 is marked at the "L" (low) level. The decoder 150 may be the same as the control circuit (18) disclosed in U.S. Pat. No. 4,127,846.

At the same time, a pulse generator circuit 121, constructed of low-power consumption components, generates a pulse having a width of a msec, as shown in FIG. 4C. By way of the AND gate 122, this FIG. 4C pulse interrogates the first address of the ROM 70 and momentarily reads out a binary code (Table 1) corresponding to the first ID number of the paged receiver (i.e., "0" from FIG. 3). The ROM 70 is constructed of high-power consumption components. The momentarily readout code (HHHH) is held by a hold circuit 110, constructed from low-power consumption components such as C-MOS flip-flops which consume less electric power. In response to the input code "HHHH", the contents of the hold circuit 110 are supplied to the decoder 90, which sets the center frequency of the variable band pass filter 30 to the first or "0" tone (600 Hz) as indicated in Table 1. After it is initialized in this manner, the receiver stands by for the receipt of an ID signal.

At any time after the receiver is in this initialized state, a tone signal of 600 Hz (corresponding to the first ID numeral "0") passes through the variable band pass filter 30 to the tone detector circuit 40. The presence or absence of the 600 Hz tone is detected according to the output level of the variable band pass filter 30. Responsive thereto, the tone detector circuit 40 gives a signal, such as that indicated in FIG. 4B, to the decoder 150, and, at the same time, to the pulse generator circuit 121.

Upon receiving the first output signal pulse from the tone detector circuit 40, the decoder 150 detects that the desired first ID digit tone (600 Hz for the ID code of FIG. 3) has been received and enables the AND gate 123 for interrogating the ROM 70 at its second address, where the code corresponding to the digit "1" is stored. Meanwhile, in response to the output of the detector circuit 40, the output from the pulse generator circuit 121 is also supplied to the AND gate 123. This coincidence of the signals at the two inputs of the AND gate 123 enables the second address in the ROM 70 to be read out responsive to the interrogation thereof. The ROM 70 operates momentarily and the second digit ("1" in this instance) of the sequence of calling ID number is thus received. Responsive to the momentary operation of the ROM, this second digit "1" is stored and held in the hold circuit 110 and supplied to the decoder 90.

Decoder 90 now sets the center frequency of the variable band pass filter 30 to 741 Hz corresponding to the tone frequency of the second digit numeral "1". The filter 30 is now ready to pass the tone signal of 741 Hz.

The sequence of the entire ID number "01234" or "01234X" of the called paging receiver is detected in this same manner. The decoder 150 then supplies an annunciator 160 with detection signals corresponding to one or another ID number and thereby informs the receiver-holder that his ID number is being paged and of the detected number (i.e., whether the "X" is or is not present). At the same time, the decoder 150 sets the input of the single AND gate 122 at the "H" level and thereby initializes the receiver, as it did when the power supply was first switched on. The circuit is now standing ready for the receipt of the first digit or "0" of the next ID signal directed to it.

Thus, according to the present invention, the duration of the more power-consuming ROM 70 operations is limited to the time actually required for readout. The ROM contains power-hungry transistors or diodes which are used for data storage. The ROM is, in effect, turned on only during the time required for reading out its contents and, thereafter, the readout data is temporarily held in the hold circuit 110 which is composed of less power-consuming elements, such as C-MOS's. The held data may thereafter be used as system data whenever there is a demand for such data. Thus, the invention provides a paging receiver which consumes less power.

FIGS. 5A through 5F show the durations of the ROM operational periods in a conventional receiver for comparison with the ROM operational periods in the receiver of the present invention. In accordance with the present invention, the paging receiver is able to achieve the improvements described hereinafter.

In FIGS. 3, 4A-4H and 5A-5F, the symbols a through g represent real numbers satisfying the following relationship:

$$0<a, \ 0<b, \ a<c, \ d, \ e, \ f, \ g$$

In this embodiment, it is assumed that $$a = 0.01 \text{ msec.}$$

At an electric field level adequate for code reception, $$c = d = e = f = g = k = 33 \text{ msec.}$$

Accordingly, when an ID number is received, the power consumption ratio between the paging receiver of the present invention and the conventional one is:

$$\frac{5 \times a}{c + d + e + f + g}$$

$$= \frac{5a}{5k}$$

$$= \frac{a}{k} = \frac{0.01}{33} = \frac{1}{3300}$$

Thus, the receiver of the present invention may reduce the power consumption of the ROM to 1/3300 of the consumption of the conventional paging receiver. In the standby for tone period (i.e., the period during which the receiver remains standing by for the receipt of the first tone of the ID number), the power consumption ratio is given by:

$$(a/b)$$

(i) If no paging call is received within a day, the operational period b of the ROM in the conventional receiver is given by:

$$1 \text{ day} = 8 \text{ hours} = 8 \times 60 \times 60 \times 1000$$
$$\text{msec} = 288 \times 10^5 \text{ msec}$$

assuming that the receiver is turned on for 8 hours during a day.

(ii) If there is one paging call during a day, the period b is given by:

$$b = 288 \times 10^5 - 5 \ k \text{ msec}$$

$$= 288 \times 10^5 - 5 \times 33 \text{ msec}$$

$$\approx 288 \times 10^5 \text{ msec}$$

Hence, $$\frac{a}{b} = \frac{1 \times 10^{-2}}{288 \times 10^5}$$

$$= \frac{1}{2.88 \times 10^9}$$

Thus, the power consumption of the ROM can be reduced to $1/2.88 \times 10^9$ of the previous level.

In the receiver of the present invention, the detector circuit 40, decoders 150 and 90, control circuit 120 and hold circuit 110 can be integrated into one chip of C-MOS transistors. The current consumption of this one chip is about 40 $\mu$A, of which about 5 $\mu$A is attributable to the additional circuits 110 and 120. According to Table 1, since logic "L" appears 19 times for the whole of 48 ($= 12 \times 4$) logic states, it appears an average of 1.5 ($= 19/12$) times per symbol. Therefore, 1.5 transistors in the ROM 70 are put into operation per symbol, on the average. Consequently, the ROM 70 consumes about 15 microamperes of current on the average. Since the present invention makes it possible to reduce this 15 $\mu$A current consumption to 1/3300, the overall current consumption of the decoder section (i.e., the one-chip integrated circuit and ROM 70 combined) is given by:

$$40 + \frac{15}{3300} = 40 \ \mu A$$

Thus, in accordance with the present invention, the current consumption of the paging receiver is 40 $\mu$A, while the current consumption of the conventional paging receiver is approximately $(40-5)+15=50$ μA. Accordingly, the paging receiver of this invention can achieve a current saving of about 20 percent, as compared with the current used by a conventional device.

Those who are skilled in the art will readily perceive how to modify the system. Therefore, the appended claims are to be construed to cover all equivalent structures which fall within the true scope and spirit of the invention.

What is claimed is:

1. A radio-paging receiver comprising means for receiving any of a plurality of tone signals, said tone signals occurring in a sequence corresponding to an identification of a paged receiver number; band pass filter means having means for selectively altering the center frequency of its pass band in response to a first control signal in order to selectively pass a corresponding one of said tone signals; means for detecting said selectively passed tone signal; means for storing codes corresponding to a predetermined identification number for an individual receiver, means for successively reading out of said code storing means sequential ones of these codes in response to a second control signal; means responsive to the readout of these codes for holding said readout code in temporary storage; decoding means responsive to the temporarily held code for supplying said first control signal to said band pass filter means; means for generating said second control signal in response to the output of said tone-detecting means; means for generating an annunciating signal when said receiver is paged; and gate means for selectively supplying said second control signal to said code storing means in order to sequentially read out said predetermined identification number.

2. A radio-paging receiver, as claimed in claim 1, wherein said means for supplying said second control signal comprises a pulse generator means for generating a pulse having a predetermined time width in response to the output of said tone detecting means, and AND gate means which respond jointly to said second control signal and to said time width pulse for operating said means for selectively supplying said second control signal.

3. A radio-paging receiver, as claimed in claim 1 or 2, wherein at least said detector means, said code holding means, said decoding means, and said second control signal generating means comprise complementary-metal oxide semiconductor field effect transistors.

4. A low-power consumption radio receiver comprising a plurality of circuit means constructed from low-power consumption components, at least one circuit means constructed from high-power consumption components, means responsive to operation of said means having low-power consumption components for detecting a central signal for the operation of said means having high-power consumption components, means responsive to said control signal for momentarily operating said means having high-power consumption components, and means constructed from said low-power consumption components which are operated responsive to said momentary operation of said means having high-power consumption components for holding the output thereof as long as said output is required for the operation of said receiver.

5. The receiver of claim 4 wherein said receiver is a paging receiver for giving a paging alarm when a signal is received which identifies the receiver, and said means having high-power consumption components is a read-only memory for storing an identification number of said receiver.

6. The receiver of claim 4 wherein said receiver is identified by a unique sequence of tone signals, and said means having high-power consumption components is a read-only memory storing said unique sequence of tone signals.

7. The receiver of any of the claims 4, 5 or 6 wherein said circuit means having low-power consumption components comprise a tunable filter means for selectively passing tone signals according to the tuning thereof, means responsive to the output of said tunable filter means for interrogating said circuit means having high-power consumption components, and means responsive to said interrogation for adjusting a band pass characteristic of said tunable filter.

8. The receiver of claim 7 and means for normally setting said tunable filter means to pass a predetermined first tone signal, whereby said receiver is normally enabled to receive signals beginning with said predetermined tone.

9. The receiver of claim 8 and means for sounding an alarm responsive to the receipt of a predetermined sequence of tone signals identified by operation of said circuit means having high-power consumption components.

* * * * *